(12) United States Patent
Fujiwara et al.

(10) Patent No.: US 12,352,280 B2
(45) Date of Patent: Jul. 8, 2025

(54) ROTARY FLUID MACHINE

(71) Applicant: DAIKIN INDUSTRIES, LTD., Osaka (JP)

(72) Inventors: Hideki Fujiwara, Osaka (JP); Harunori Miyamura, Osaka (JP); Yusuke Irino, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/823,589

(22) Filed: Sep. 3, 2024

(65) Prior Publication Data

US 2024/0426311 A1 Dec. 26, 2024

Related U.S. Application Data

(63) Continuation of application No. PCT/JP2023/012512, filed on Mar. 28, 2023.

(30) Foreign Application Priority Data

Mar. 28, 2022 (JP) .................................. 2022-052190

(51) Int. Cl.
  *F04D 29/051* (2006.01)
  *F04D 17/10* (2006.01)
  *F04D 29/42* (2006.01)
  *F16C 32/04* (2006.01)

(52) U.S. Cl.
  CPC ......... *F04D 29/0513* (2013.01); *F04D 17/10* (2013.01); *F04D 29/4206* (2013.01); *F16C 32/04* (2013.01)

(58) Field of Classification Search
  CPC .... H02K 7/09; H02K 2205/03; F04D 29/051; F04D 29/058; F16C 32/0402; F16C 37/005; F05D 2240/51; F05D 2240/515
  See application file for complete search history.

(56) References Cited

U.S. PATENT DOCUMENTS

| 5,345,127 | A | * | 9/1994 | New | F16C 32/0402 |
| | | | | | 310/90.5 |
| 6,367,241 | B1 | | 4/2002 | Ress, Jr. et al. | |
| 8,801,398 | B2 | * | 8/2014 | Korenblik | F04D 17/122 |
| | | | | | 417/372 |

(Continued)

FOREIGN PATENT DOCUMENTS

| CN | 109510370 A | 3/2019 |
| JP | 2016-166536 A | 9/2016 |

(Continued)

OTHER PUBLICATIONS

International Search Report of corresponding PCT Application No. PCT/JP2023/012512 dated May 30, 2023.

(Continued)

*Primary Examiner* — Justin D Seabe
(74) *Attorney, Agent, or Firm* — GLOBAL IP COUNSELORS, LLP (57) ABSTRACT

A rotary fluid machine includes a casing, a partition member that partitions a space in the casing into a first space and a second space, and a rotary shaft provided in the casing. The rotary shaft is rotatably supported. The partition member includes a thrust magnetic bearing that supports the rotary shaft in an axial direction.

6 Claims, 11 Drawing Sheets

(56) References Cited

U.S. PATENT DOCUMENTS

| | | | |
|---|---|---|---|
| 11,808,279 B1 | 11/2023 | Okada et al. | |
| 2019/0301401 A1* | 10/2019 | Motomura | H02K 49/106 |
| 2021/0010536 A1* | 1/2021 | Yamasuso | F04D 29/051 |
| 2022/0224198 A1 | 7/2022 | Fujiwara et al. | |

FOREIGN PATENT DOCUMENTS

| | | |
|---|---|---|
| JP | 2020-159263 A | 10/2020 |
| JP | 2020-193576 A | 12/2020 |
| JP | 2021-55613 A | 4/2021 |
| JP | 2021-161894 A | 10/2021 |
| WO | 2015/043881 A1 | 4/2015 |

OTHER PUBLICATIONS

International Preliminary Report of corresponding PCT Application No. PCT/JP2023/012512 dated Oct. 10, 2024.
European Search Report of corresponding EP Application No. 23 78 0524.7 dated Mar. 13, 2025.

\* cited by examiner

ROTARY FLUID MACHINE

CROSS-REFERENCE TO RELATED APPLICATIONS

This is a continuation of International Application No. PCT/JP2023/012512 filed on Mar. 28, 2023, which claims priority to Japanese Patent Application No. 2022-052190, filed on Mar. 28, 2022. The entire disclosures of these applications are incorporated by reference herein.

BACKGROUND

Technical Field

The present disclosure relates to a rotary fluid machine.

Background Art

Japanese Unexamined Patent Publication No. 2020-193576 discloses a centrifugal compressor. In the centrifugal compressor described in Japanese Unexamined Patent Publication No. 2020-193576, a thrust force from the rear side to the front side acts on an impeller due to axial differential pressure. When a current is applied to an internal coil of a thrust magnetic bearing, an electromagnetic force against the thrust force on the impeller is generated, supporting the axial direction of a rotary shaft in the axial direction.

SUMMARY

A first aspect is directed to a rotary fluid machine. The rotary fluid machine includes: a casing; a partition member configured to partition a space in the casing into a first space and a second space; and a rotary shaft provided in the casing and rotatably supported. The partition member includes a thrust magnetic bearing configured to support the rotary shaft in an axial direction.

DETAILED DESCRIPTION OF EMBODIMENT(S)

Embodiments of the present disclosure will be described in detail below with reference to the drawings. The present disclosure is not limited to the embodiments shown below, and various changes can be made within the scope without departing from the technical concept of the present disclosure. Each of the drawings is intended to illustrate the present disclosure conceptually, and dimensions, ratios, or numbers may be exaggerated or simplified as necessary for the sake of ease of understanding.

Exemplary embodiments will be described in detail below based on the drawings.

General Configuration

A compressor (100) will be described with reference to FIGS. 1 to 3. The compressor (100) is an example of a rotary fluid machine of the present invention. The compressor (100) is, for example, a centrifugal compressor. The compressor (100) sucks a refrigerant, compresses the sucked refrigerant, and discharges the compressed refrigerant. The refrigerant is, for example, a HFC refrigerant R32. Note that R32 is merely an example of the type of the refrigerant, and the compressor (100) may compress and discharge a refrigerant other than R32.

Figure 1:
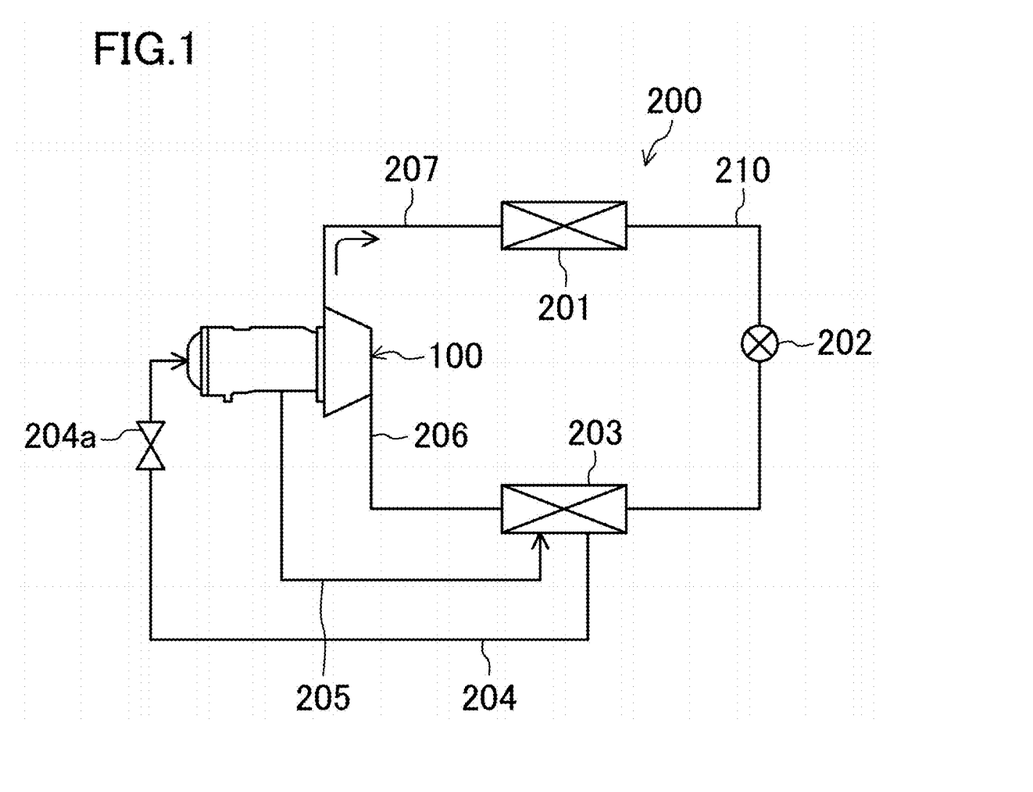
FIG. 1 is a schematic diagram illustrating an entire configuration of a refrigeration apparatus according to an embodiment.

As illustrated in FIG. 1, the compressor (100) is installed in a refrigeration apparatus (200). The refrigeration apparatus (200) includes a refrigerant circuit (210) filled with a refrigerant. The refrigerant circuit (210) includes the compressor (100), a condenser (201), an expansion valve (202), an evaporator (203), a refrigerant passage (206) provided between the compressor (100) and the evaporator (203), and a refrigerant passage (207) provided between the compressor (100) and the condenser (201).

A first branch passage (204) and a second branch passage (205) are connected to the refrigerant circuit (210). One end of the first branch passage (204) is connected to the evaporator (203). The other end of the first branch passage (204) is connected to an inlet end of a refrigerant passage (Z) (see FIG. 5) of the compressor (100). The first branch passage (204) is provided with a regulating valve (204a) capable of adjusting the opening degree of the first branch passage (204). One end of the second branch passage (205) is connected to an outlet end of the refrigerant passage (Z). The other end of the second branch passage (205) is connected to the evaporator (203).

Figure 2:
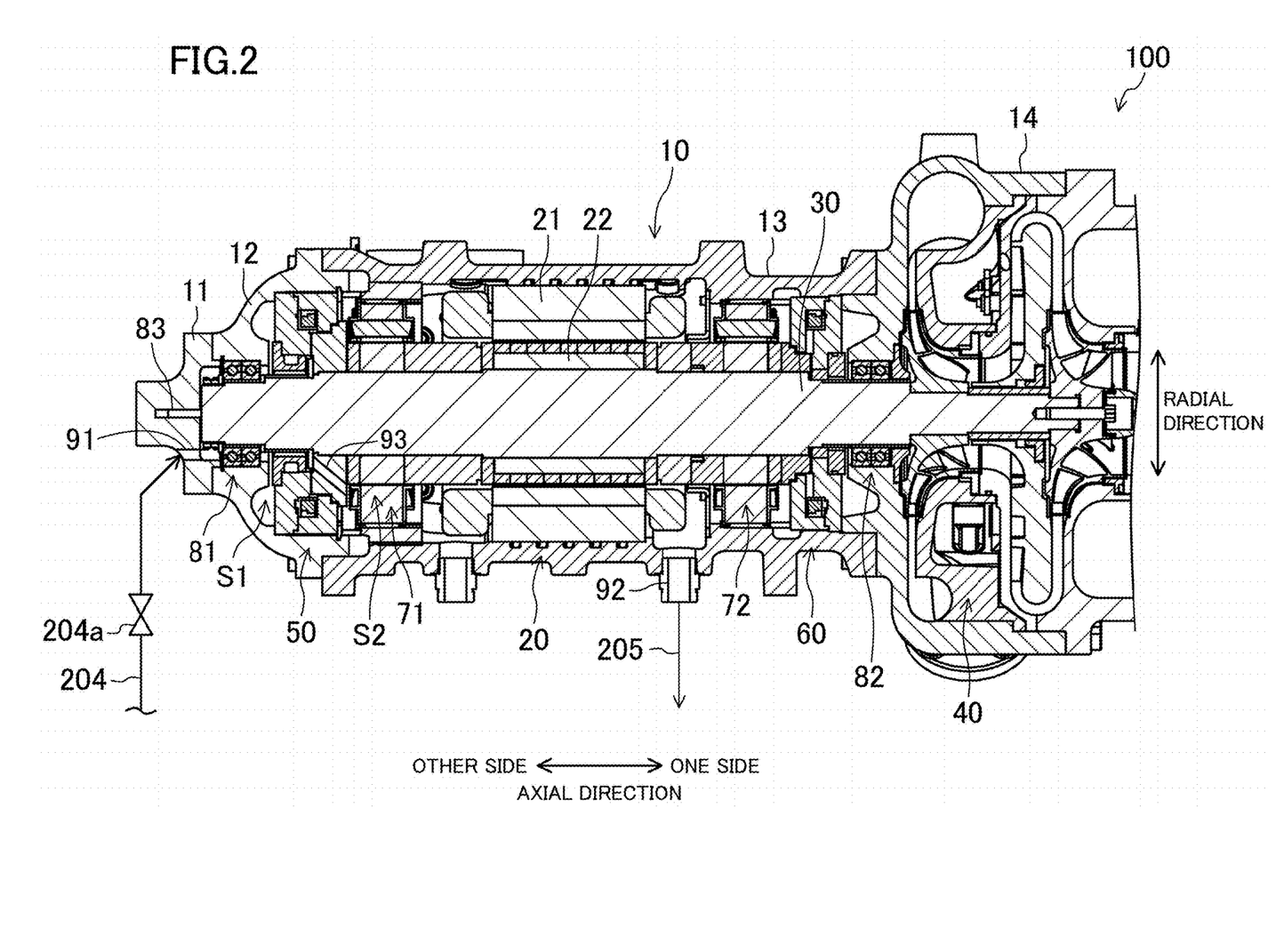
FIG. 2 is a sectional view of a compressor.
Figure 3:
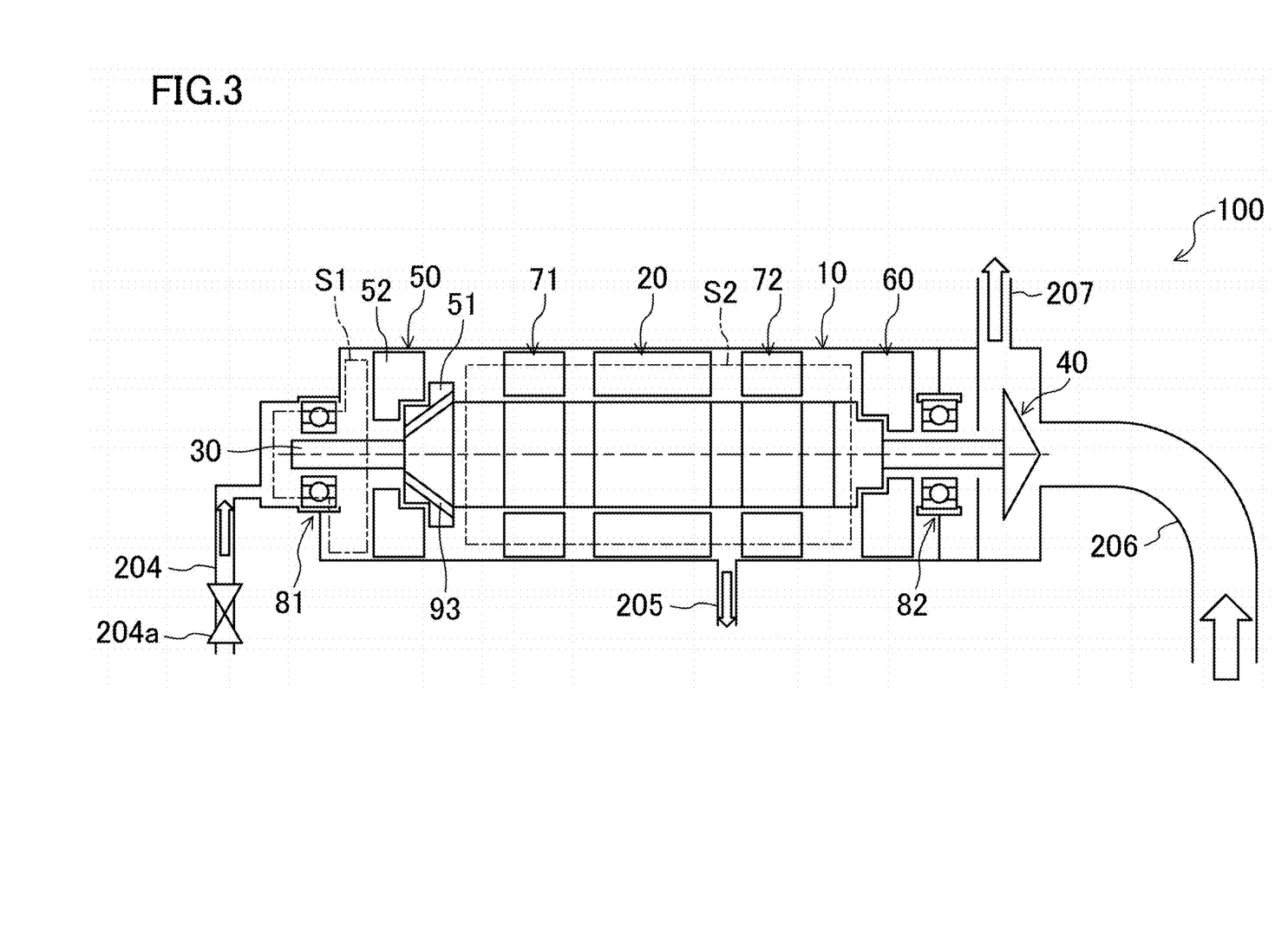
FIG. 3 is a schematic view of the compressor.

The compressor (100) compresses the refrigerant that has flowed into an impeller chamber that houses an impeller (40) by the rotation of the impeller (40) (see FIGS. 2 and 3). The refrigerant compressed by the compressor (100) is supplied to the condenser (201) through the refrigerant passage (207), and dissipates heat to the air in the condenser (201) to condense. The refrigerant condensed in the condenser (201) is decompressed through the expansion valve (202). The refrigerant decompressed through the expansion valve (202) absorbs heat from the air to evaporate in the evaporator (203). The refrigerant evaporated in the evaporator (203) is sent to the compressor (100) through the refrigerant passage (206), and is compressed again in the compressor (100).

Part of the refrigerant sent to the evaporator (203) is supplied to the compressor (100) through the first branch passage (204). The refrigerant supplied to the compressor (100) passes through the compressor (100), is supplied to the second branch passage (205), and then to the evaporator (203) via the second branch passage (205).

As illustrated in FIGS. 2 and 3, the compressor (100) includes a casing (10), a motor (20), a rotary shaft (30), an impeller (40), a first thrust magnetic bearing (50), a second thrust magnetic bearing (60), a first radial magnetic bearing (71), a second radial magnetic bearing (72), a first touchdown bearing (81), and a second touchdown bearing (82).

The casing (10) is a hollow member. The casing (10) includes a first casing portion (11), a second casing portion (12), a third casing portion (13), and a fourth casing portion (14). The first casing portion (11), the second casing portion (12), the third casing portion (13), and the fourth casing portion (14) are arranged in this order toward one side in an axial direction. The axial direction is a direction parallel to the direction in which the rotary shaft (30) extends.

The first casing portion (11) is provided to close an end of the casing (10) on one side in the axial direction. The second casing portion (12) is connected to the first casing portion (11). The first thrust magnetic bearing (50) and the first touchdown bearing (81) are placed in the second casing portion (12). The third casing portion (13) is connected to the second casing portion (12). The motor (20), the second thrust magnetic bearing (60), the first radial magnetic bearing (71), and the second radial magnetic bearing (72) are placed in the third casing portion (13). The fourth casing portion (14) is connected to the third casing portion (13). The impeller (40) and the second touchdown bearing (82) are placed in the fourth casing portion (14).

The motor (20) drives and rotates the rotary shaft (30). When the rotary shaft (30) is driven and rotated, the impeller (40) (see FIGS. 2 and 3) rotates and the refrigerant flowed into the impeller chamber is compressed. A stator (21) of the motor (20) is fixed to an inner peripheral wall of the casing (10). A rotor (22) is disposed in a radially inner side (Q1) with respect to the stator (21). The radial direction is a direction that passes through the axis (P) of the rotary shaft (30) and that is perpendicular to the axial direction. The radially inner side (Q1) is a side toward the axis (P) of the rotary shaft (30) in the radial direction. A radially outer side (Q2) is a direction away from the axis (P) of the rotary shaft (30) in the radial direction.

The rotary shaft (30) is fixed to the radially inner side (Q1) of the rotor (22). The rotary shaft (30) extends in the axial direction. The impeller (40) is fixed to one side of the rotary shaft (30) in the axial direction.

The first radial magnetic bearing (71) is located on the other side of the motor (20) in the axial direction. The second radial magnetic bearing (72) is located on one side of the motor (20) in the axial direction. The first radial magnetic bearing (71) and the second radial magnetic bearing (72) support the rotary shaft (30) rotatably with respect to the casing (10) by magnetic levitation.

The first thrust magnetic bearing (50) and the second thrust magnetic bearing (60) support the rotary shaft (30) in the axial direction. Supporting the rotary shaft (30) in the axial direction means supporting the rotary shaft (30) such that the rotary shaft (30) is positioned within a predetermined range in the axial direction. The first thrust magnetic bearing (50) is located on the other side of the first radial magnetic bearing (71) in the axial direction. The first thrust magnetic bearing (50) pulls the rotary shaft (30) toward the other side in the axial direction by a magnetic force. The second thrust magnetic bearing (60) is located on one side of the second radial magnetic bearing (72) in the axial direction. The second thrust magnetic bearing (60) pulls the rotary shaft (30) toward the one side in the axial direction by a magnetic force.

Although the pressure toward the one side in the axial direction acts on the rotary shaft (30) with the rotation of the impeller (40), the first thrust magnetic bearing (50) pulls the rotary shaft (30) to the other side in the axial direction, bringing the axial forces acting on the impeller (40) in balance. If the pulling force of the first thrust magnetic bearing (50) (the force pulling the rotary shaft (30) toward the other side in the axial direction) is excessive, the rotary shaft (30) is pulled toward the one side in the axial direction by the second thrust magnetic bearing (60).

The first touchdown bearing (81) is located on the other side of the first thrust magnetic bearing (50) in the axial direction. The second touchdown bearing (82) is located on the one side of the second thrust magnetic bearing (60) in the axial direction. The first touchdown bearing (81) and the second touchdown bearing (82) function as bearings when the compressor (100) is out of control due to some trouble (e.g., when the rotary shaft (30) cannot be magnetically levitated due to a power failure that stops the power supply to the first radial magnetic bearing (71) or any other components). This can protect the first thrust magnetic bearing (50), the second thrust magnetic bearing (60), the first radial magnetic bearing (71), and the second radial magnetic bearing (72).

The rotary shaft (30) is provided with a grounding member (83). The grounding member (83) is a member that grounds the rotary shaft (30). The grounding member (83) protects sensors provided for the compressor (100) by passing charged electricity to the rotor (22). The grounding member (83) includes, for example, a carbon rod. The grounding member (83) is provided on the one side of the rotary shaft (30) in the axial direction. The grounding member (83) faces an axial portion (30a). The axial portion (30a) is a portion of the other end of the rotary shaft (30) in the axial direction and is around the axis (P). The grounding member (83) is pressed against the rotary shaft (30) by an elastic member such as a spring.

First Embodiment

Figure 4:
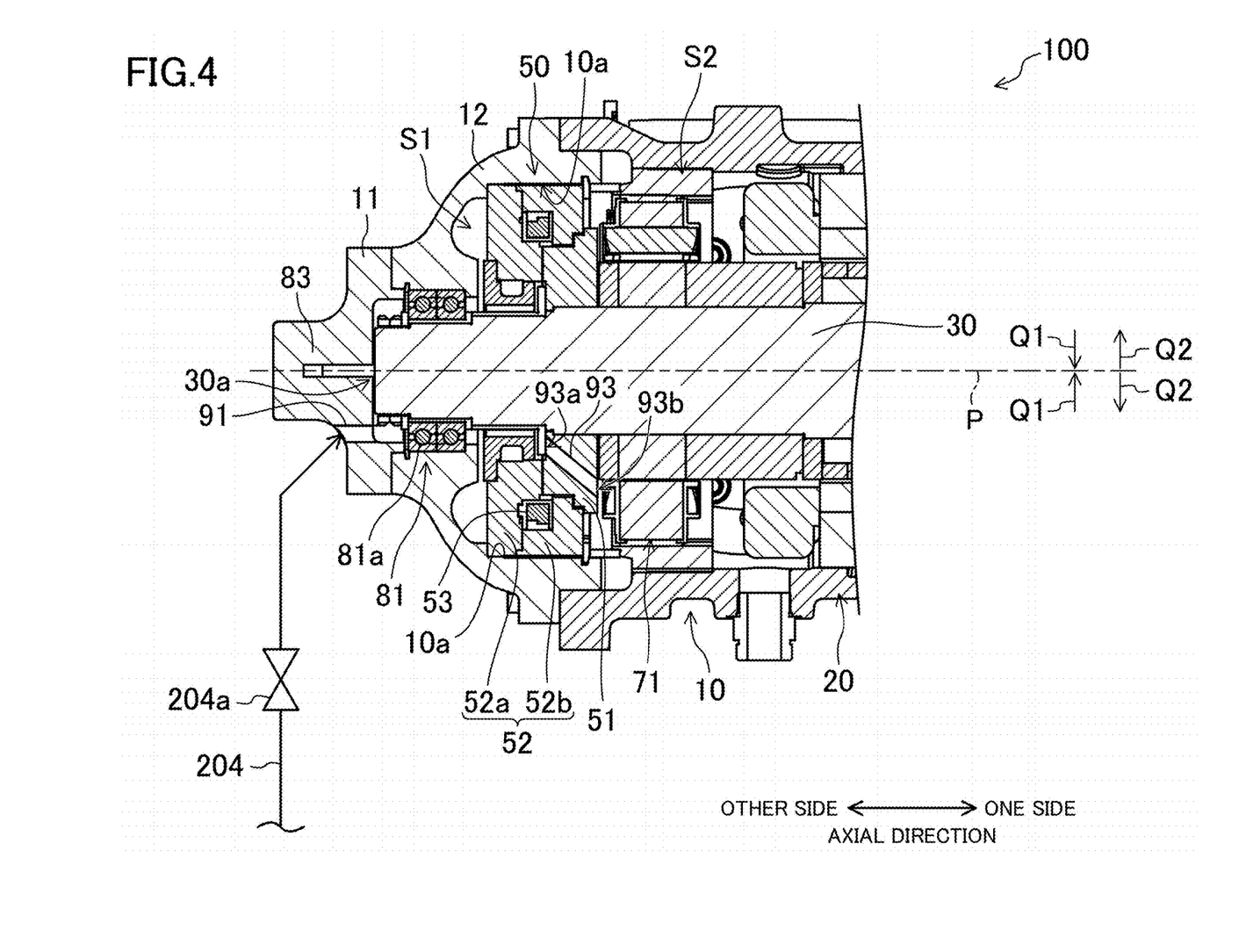
FIG. 4 is a partially enlarged view of the compressor shown in FIG. 2.

As illustrated in FIGS. 2 to 4, the first touchdown bearing (81) includes a bearing (81a). The bearing (81a) rotatably supports the rotary shaft (30). The first thrust magnetic bearing (50) is provided on one side of the bearing (81a) in the axial direction.

The first thrust magnetic bearing (50) includes a rotor (51), a stator (52) disposed to face the rotor (51), and a coil (53) wound around the stator (52).

The rotor (51) is fixed to the rotary shaft (30) and rotates together with the rotary shaft (30).

The stator (52) is provided in the radially outer side (Q2) with respect to the rotor (51). The stator (52) includes a first stator portion (52a) and a second stator portion (52b). The first stator portion (52a) and the second stator portion (52b) are fixed to each other. The first stator portion (52a) is disposed on the other side of the second stator portion (52b) in the axial direction. The first stator portion (52a) faces the rotor (51) from the other side in the axial direction. The second stator portion (52b) faces the rotor (51) from the radially outer side (Q2). In this embodiment, the stator (52) includes a plurality of components (the first stator portion (52a) and the second stator portion (52b)), but the present invention is not limited to this example. The stator (52) may include any number of components, and for example, the stator (52) may include a single member.

Space in Casing

The casing (10) includes a first space (S1) and a second space (S2).

The first space (S1) is located on the one side of the first thrust magnetic bearing (50) in the axial direction. The bearing (81a) of the first touchdown bearing (81) is placed in the first space (S1). The second space (S2) is located on the other side of the first thrust magnetic bearing (50) in the axial direction. The first radial magnetic bearing (71), the motor (20), and the like are placed in the second space (S2).

The casing (10) has a first communication hole (91) and a second communication hole (92). The first communication hole (91) allows the first space (S1) to communicate with the outside of the casing (10). The first communication hole (91) is provided in the first casing portion (11). The first branch passage (204) (see FIG. 1) communicates with the first communication hole (91). The second communication hole (92) allows the second space (S2) to communicate with the outside of the casing (10). The second communication hole (92) is provided in the third casing portion (13). The second branch passage (205) (see FIG. 1) communicates with the second communication hole (92).

The rotor (51) has a rotor passage (93). The rotor passage (93) is a hole penetrating the rotor (51). The rotor passage (93) includes a first rotor opening (93a) and a second rotor opening (93b). Each of the first rotor opening (93a) and the second rotor opening (93b) allows the inside and outside of the rotor passage (93) to communicate with each other. The second rotor opening (93b) is located in the radially outer side (Q2) of the first rotor opening (93a). The second rotor opening (93b) is located on the one side of the first rotor opening (93a) in the axial direction. In the first embodiment, the rotor passage (93) has a shape extending linearly from the first rotor opening (93a) toward the second rotor opening (93b). The rotor passage (93) communicates with the first space (S1) via the first rotor opening (93a) and communicates with the second space (S2) via the second rotor opening (93b).

Configuration for Partitioning Space in Casing

The space in the casing (10) is partitioned into the first space (S1) and the second space (S2) by the first thrust magnetic bearing (50).

When the space in the casing (10) is partitioned into the first space (S1) and the second space (S2), the first space (S1) and the second space (S2) may be completely blocked from communicating with each other so that no fluid flows between the first space (S1) and the second space (S2), or the first space (S1) and the second space (S2) may slightly communicate with each other to such an extent that a differential pressure generated between the first space (S1) and the second space (S2) by adjusting the air pressure of the first space (S1) and the air pressure of the second space (S2) is maintained.

The following description will discuss a configuration in which the first thrust magnetic bearing (50) partitions the interior of the casing (10) into the first space (S1) and the second space (S2).

The first space (S1) and the second space (S2) are separated by bringing the stator (52) of the first thrust magnetic bearing (50) into close contact with an inner wall (10a) of the casing (10) and using the property of the first thrust magnetic bearing (50).

Close Contact Configuration

The stator (52) of the first thrust magnetic bearing (50) is brought into close contact with the inner wall (10a) of the casing (10) by, for example, shrink fitting. When the stator (52) makes close contact with the inner wall (10a) of the casing (10), no clearance is left between the stator (52) and the inner wall (10a) of the casing (10), or a small clearance is left between the stator (52) and the inner wall (10a) of the casing (10) to such an extent that the space in the casing (10) is kept partitioned into the first space (S1) and the second space (S2) (the differential pressure between the first space (S1) and the second space (S2) is maintained).

Property of First Thrust Magnetic Bearing

The first thrust magnetic bearing (50) is configured to support the rotor (51), which is a rotating body, in a non-contact manner by an electromagnetic force, and the magnitude of the force that supports the rotor (51) is determined for the size of the clearance between the rotor (51) and the stator (52). Thus, the clearance needs to be created with high accuracy to stably support the rotor (51). The first thrust magnetic bearing (50) has a narrower clearance between the rotor (51) as a rotating member and the stator (52) as a fixed member than the other thrust magnetic bearings. For example, the clearance between the rotor (51) and the stator (52) of the first thrust magnetic bearing (50) is about 0.5 mm to 1 mm. In contrast, the clearance between the stator (21) and the rotor (22) of the motor (20) is, for example, about 3 mm. The inventors of the present invention have found the property of the first thrust magnetic bearing (50), i.e., accurately forming the first thrust magnetic bearing (50) with a small clearance between the rotor (51) and the stator (52) effectively seals the clearance between the rotor (51) and the stator (52), and thus effectively keeps a fluid from flowing through the clearance between the rotor (51) as the rotating member and the stator (52) as the fixed member. For this property, the first thrust magnetic bearing (50) is employed as a partitioning member that separates the first space (S1) and the second space (S2).

The close contact configuration can keep the fluid from flowing between the stator (52) and the inner wall (10a) of the casing (10), and the property of the first thrust magnetic bearing (50) can keep the fluid from flowing between the rotor (51) as the rotating member and the stator (52) as the fixed member. Thus, when the close contact configuration and the property of the first thrust magnetic bearing (50) are employed, the first space (S1) and the second space (S2) can be separated from each other, and the differential pressure between the first space (S1) and the second space (S2) can be effectively maintained. In the first embodiment, the pressure (air pressure) in the first space (S1) is lower than the pressure of the refrigerant just evaporated in the evaporator (203), and the pressure in the second space (S2) is substantially equal to the pressure of the refrigerant just evaporated in the evaporator (203).

Refrigerant Passage

Figure 5:
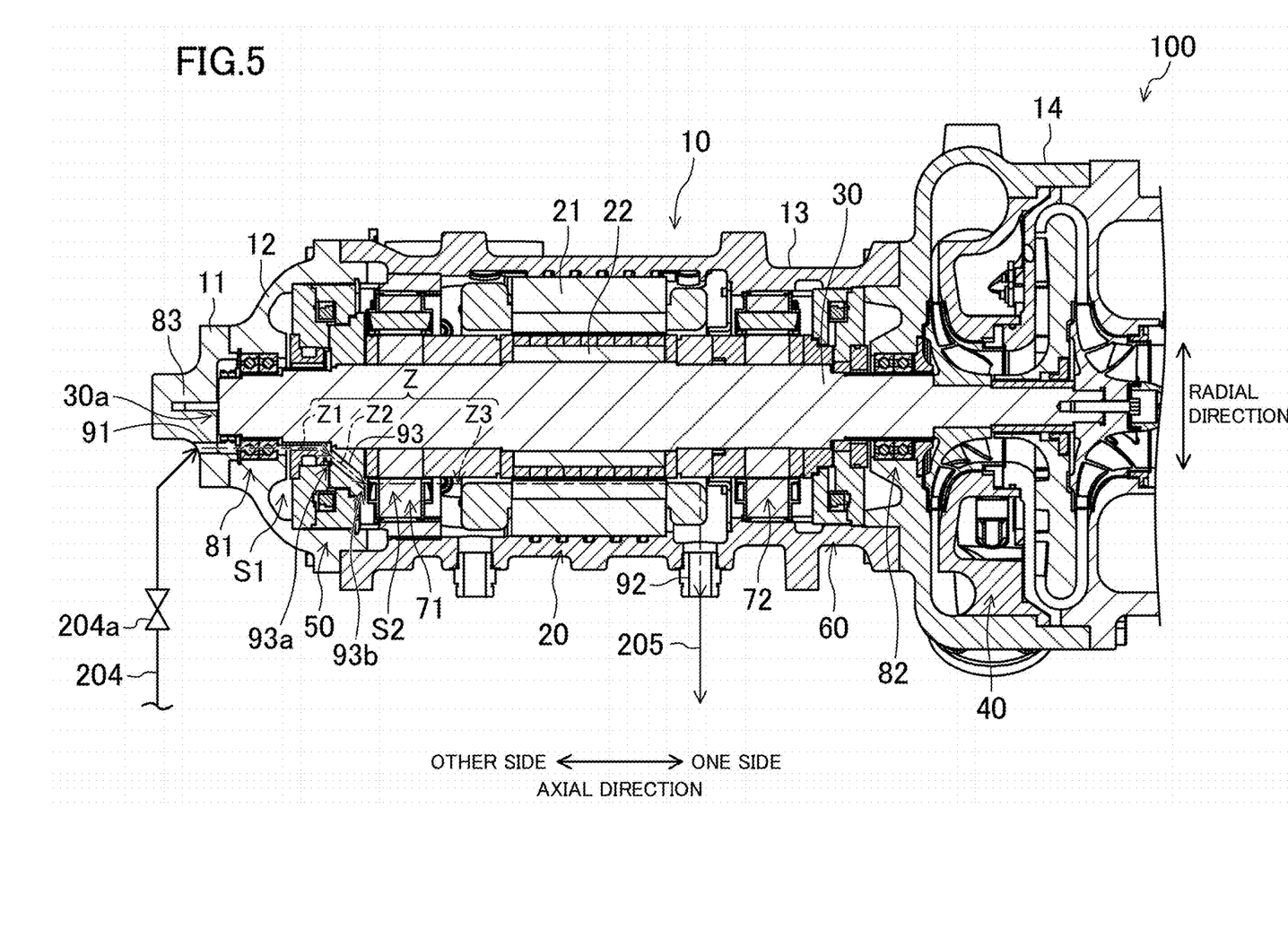
FIG. 5 is a view illustrating a refrigerant passage.

As illustrated in FIG. 5, a refrigerant passage (Z) is provided in the casing (10). The refrigerant passage (Z) is a passage for sending the refrigerant to the motor (20). The refrigerant flowing through the refrigerant passage (Z) may be gas or may contain liquid such as mist. The refrigerant passage (Z) includes a first passage (Z1), an intermediate passage (Z2), and a second passage (Z3).

The first passage (Z1) is a refrigerant passage provided in the first space (S1). The first passage (Z1) communicates with the first branch passage (204) (see FIG. 1) and the intermediate passage (Z2). The first passage (Z1) extends from the first communication hole (91) to the first space (S1), passes through the bearing (81a) in the first space (S1), and communicates with the intermediate passage (Z2).

The intermediate passage (Z2) is a refrigerant passage provided in the first thrust magnetic bearing (50), and is located between the first space (S1) and the second space (S2). The intermediate passage (Z2) communicates with the first passage (Z1) and the second passage (Z3). In the first embodiment, the intermediate passage (Z2) is constituted of the rotor passage (93). In the first embodiment, the first rotor opening (93a) of the rotor passage (93) communicates with the first passage (Z1), and the second rotor opening (93b) of the rotor passage (93) communicates with the second passage (Z3).

The second passage (Z3) is a refrigerant passage provided in the second space (S2). The second passage (Z3) communicates with the intermediate passage (Z2) and the second branch passage (205) (see FIG. 1). The second passage (Z3) extends from the intermediate passage (Z2), passes through the first radial magnetic bearing (71) and the motor (20), and communicates with the second communication hole (92).

Cooling Operation of Motor

As illustrated in FIG. 5, the motor (20) rotationally drives the rotary shaft (30) to rotate the rotor (51) of the first thrust magnetic bearing (50) together with the rotary shaft (30). As described above, the second rotor opening (93b) is located in the radially outer side (Q2) of the first rotor opening (93a) in the rotor passage (93). Thus, when the rotor (51) rotates, a centrifugal force acts on the refrigerant in the rotor passage (93) to send the refrigerant from the first rotor opening (93a) toward the second rotor opening (93b). This allows the rotor passage (93) rotating together with the rotary shaft (30) to function as a pump for sending the refrigerant. Thus, the pumping function of the rotor passage (93) can effectively send the refrigerant flowing through the first branch passage (204) (see FIG. 1) to the first passage (Z1), the intermediate passage (Z2), and the second passage (Z3) in this order.

The refrigerant flowing between the stator (21) and the rotor (22) of the motor (20) in the second passage (Z3) cools the rotor (22) of the motor (20). The refrigerant that has flowed through the second passage (Z3) is sent to the second branch passage (205) through the second communication hole (92).

The above-described structure in which the rotor (51) is provided with the rotor passage (93) and the refrigerant is sent by the pumping function of the rotor passage (93) is a first example of a pump structure of the present invention.

Advantages

As described above, the space in the casing (10) is partitioned into the first space (S1) and the second space (S2) by the first thrust magnetic bearing (50). Partitioning the space in the casing (10) into the first space (S1) and the second space (S2) allows a differential pressure generated between the first space (S1) and the second space (S2) to be easily maintained. When the differential pressure generated between the first space (S1) and the second space (S2) is maintained, the rotary shaft (30) can be effectively pulled in the axial direction by pressure due to the pressure difference (differential pressure) between the first space (S1) and the second space (S2). As a result, the rotary shaft (30) can be supported in the axial direction by using not only the pulling force of the first thrust magnetic bearing (50) (the force pulling the rotary shaft (30) in the axial direction) but also the differential pressure between the first space (S1) and the second space (S2). This allows the rotary shaft (30) to be stably supported in the axial direction.

Making use of the differential pressure between the first space (S1) and the second space (S2) when pulling the rotary shaft (30) in the axial direction can reduce the pulling force of the first thrust magnetic bearing (50). This enables reduction in the size of the first thrust magnetic bearing (50). Further, the pulling force of the first thrust magnetic bearing (50) can be reduced, and the power consumed by the first thrust magnetic bearing (50) can be reduced. As a result, the rotary shaft (30) can be efficiently supported in the axial direction.

The second space (S2) is higher in air pressure than the first space (S1). Thus, the rotary shaft (30) can be pulled toward the first space (S1).

The refrigerant is sent to the second space (S2) by the pump structure using the rotor passage (93). This can effectively adjust the differential pressure between the first space (S1) and the second space (S2) so that the second space (S2) is higher in air pressure than the first space (S1).

The first branch passage (204) is provided with the regulating valve (204a) capable of adjusting the opening degree of the first branch passage (204). Thus, the differential pressure between the first space (S1) and the second space (S2) can be adjusted by the regulating valve (204a) by, for example, reducing the opening degree of the regulating valve (204a) to lower the air pressure of the second space (S2) when the air pressure of the second space (S2) is too high, or increasing the opening degree of the regulating valve (204a) to raise the air pressure of the second space (S2) when the air pressure of the second space (S2) is too low. As a result, adjusting the differential pressure can stably support the rotary shaft (30) in the axial direction.

The regulating valve (204a) can adjust the position of the rotary shaft (30) in the axial direction by, for example, reducing the opening degree of the regulating valve (204a) to lower the air pressure in the second space (S2) so that the rotary shaft (30) moves toward the second space (S2) when the rotary shaft (30) is too close to the first space (S1), or increasing the opening degree of the regulating valve (204a) to raise the air pressure in the second space (S2) so that the rotary shaft (30) moves toward the first space (S1) when the rotary shaft (30) is too close to the second space (S2). As a result, the rotary shaft (30) can be stably supported in the axial direction.

Second Embodiment

A second embodiment of the compressor (100) will be described with reference to FIG. 6. The second embodiment is different from the first embodiment in the shape of the rotor passage (93). Thus, differences from the first embodiment will be mainly described below.

Figure 6:
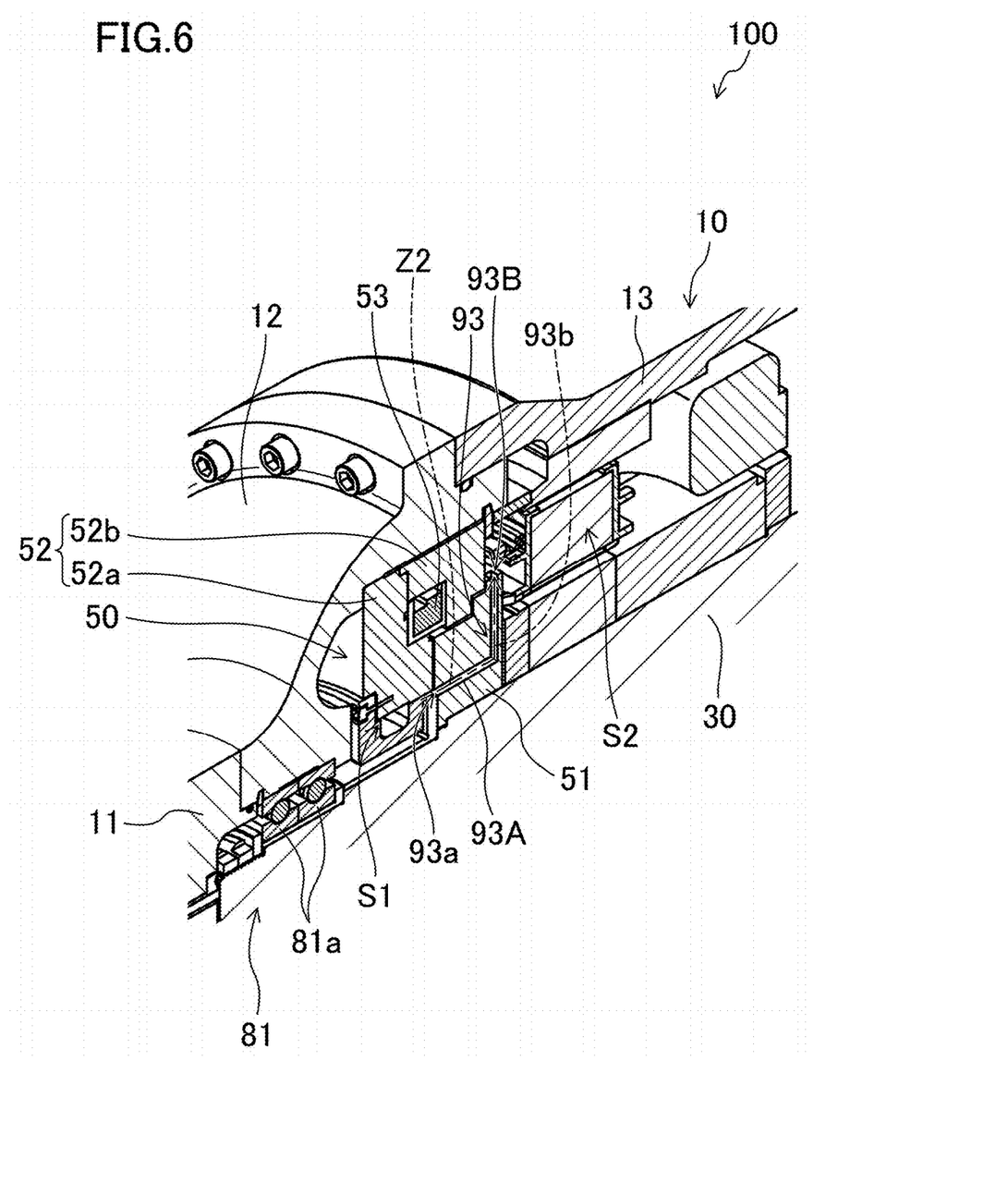
FIG. 6 is a view illustrating a second embodiment of the compressor.

As illustrated in FIG. 6, the intermediate passage (Z2) is formed by the rotor passage (93). The rotor passage (93) includes a first rotor passage portion (93A) and a second rotor passage portion (93B). The first rotor passage portion (93A) and the second rotor passage portion (93B) extend in directions perpendicular to each other. The first rotor passage portion (93A) extends in parallel to the axial direction. A first rotor opening (93a) communicating with the first space (S1) is provided on the other side of the first rotor passage portion (93A) in the axial direction. The second rotor passage portion (93B) extends in the radial direction. A radially inner side (Q1) of the second rotor passage portion (93B) communicates with an end of the first rotor passage portion (93A) on one side in the axial direction. A second rotor opening (93b) communicating with the second space (S2) is provided in the radially outer side (Q2) of the second rotor passage portion (93B).

As described above, when the rotor passage (93) is formed into a substantially L-shape by the first rotor passage portion (93A) and the second rotor passage portion (93B), the second rotor opening (93b) can be formed at the radially outermost position of the rotor (51). This can improve the efficiency of pumping the refrigerant by the pumping function of the rotor passage (93).

Third Embodiment

A third embodiment of the compressor (100) will be described with reference to FIG. 7. The third embodiment is different from the first embodiment in the shape of the intermediate passage (Z2). Thus, differences from the first embodiment will be mainly described below.

Figure 7:
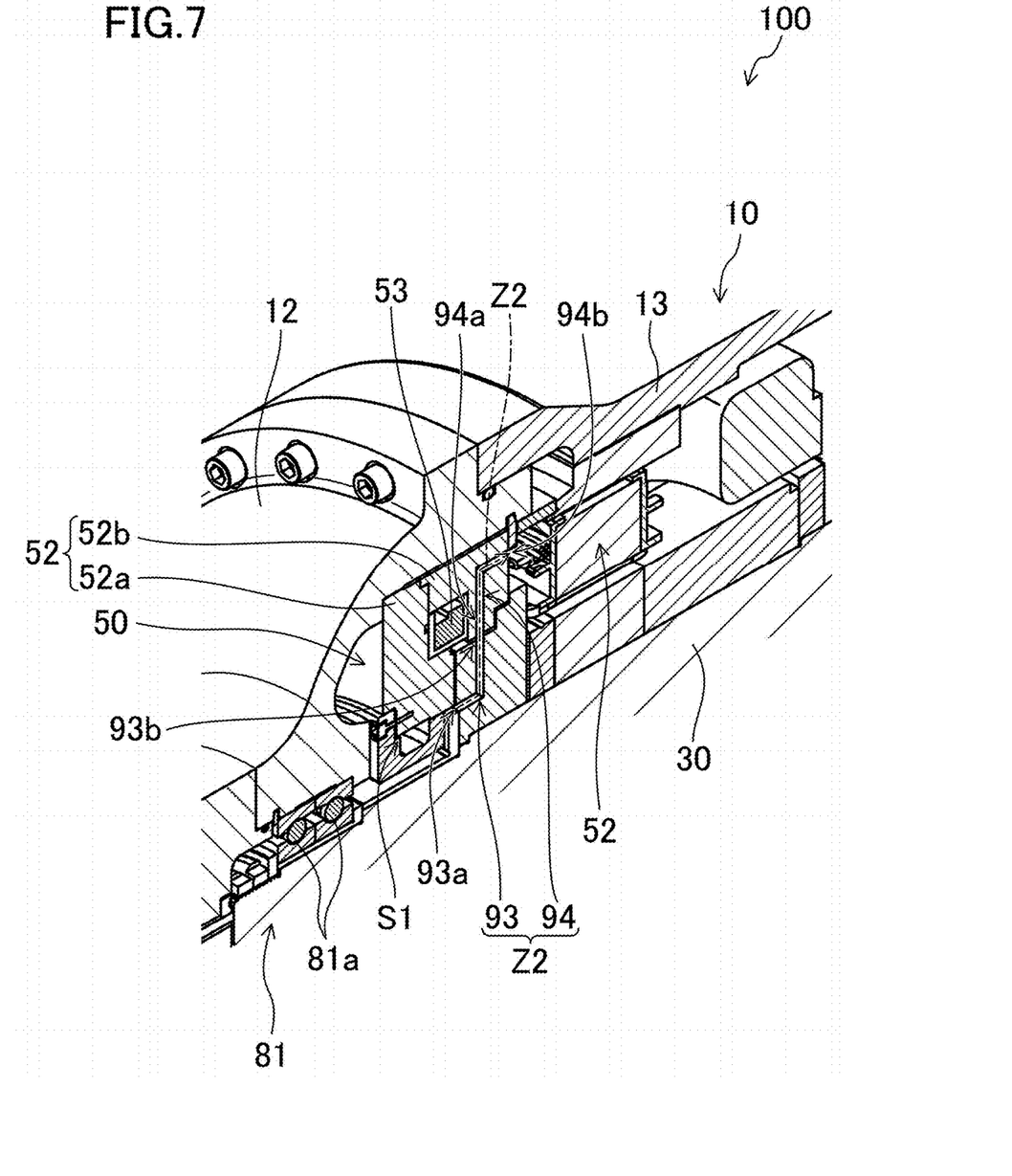
FIG. 7 is a view illustrating a third embodiment of the compressor.

As illustrated in FIG. 7, the intermediate passage (Z2) includes a rotor passage (93) and a stator passage (94). Each of the rotor passage (93) and the stator passage (94) has a substantially L-shape. The rotor passage (93) communicates with the first space (S1) via the first rotor opening (93a). The stator passage (94) communicates with the second space (S2) via the second stator opening (94b).

The stator passage (94) is a hole formed in the stator (52) to penetrate the stator (52). In the third embodiment, the stator passage (94) is provided in the second stator portion (52b). The stator passage (94) is provided in the radially outer side (Q2) of the rotor passage (93). The stator passage (94) includes a first stator opening (94a) and a second stator opening (94b). Each of the first stator opening (94a) and the second stator opening (94b) allows the inside and outside of the stator passage (94) to communicate with each other. The second stator opening (94b) is located in the radially outer side (Q2) of the first stator opening (94a). The second stator opening (94b) is located on one side of the first stator opening (94a) in the axial direction.

In terms of axial position, the first stator opening (94a) is located at the same position as the second rotor opening (93b) of the rotor passage (93). When the rotary shaft (30) rotates, the second rotor opening (93b) rotates together with the rotary shaft (30), and the second rotor opening (93b) faces the first stator opening (94a), thereby allowing the rotor passage (93) to communicate with the stator passage (94).

When the rotor passage (93) and the stator passage (94) communicate with each other, the refrigerant flowing through the first passage (Z1) flows into the rotor passage (93) and then to the stator passage (94). Thus, the stator (52) can be cooled by the refrigerant flowing through the stator passage (94).

Fourth Embodiment

A fourth embodiment of the compressor (100) will be described with reference to FIGS. 8 and 9. The fourth embodiment is different from the third embodiment in the structure for allowing the rotor passage (93) and the stator passage (94) to communicate with each other. Thus, differences from the third embodiment will be mainly described below.

Figure 8:
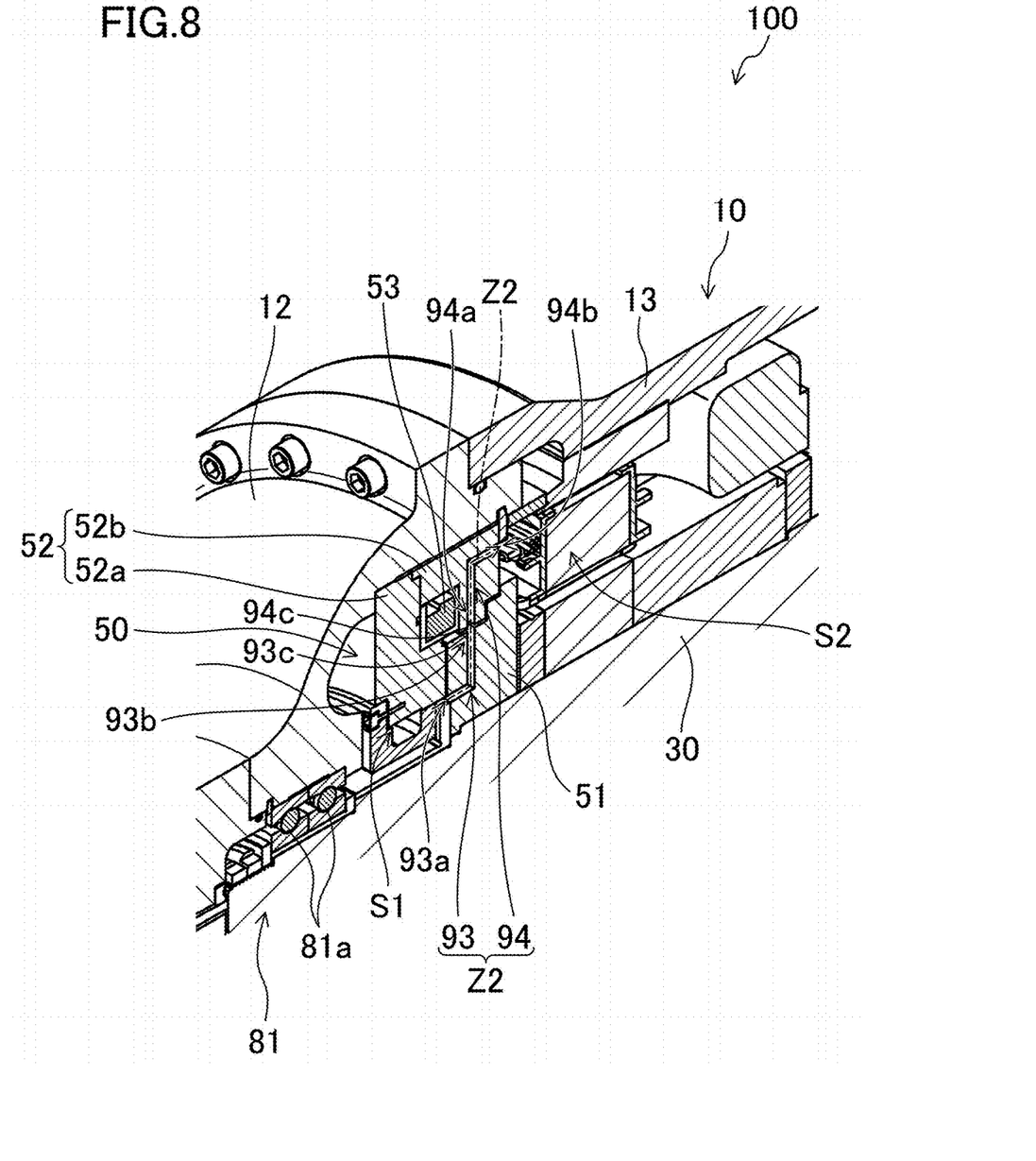
FIG. 8 is a view illustrating a fourth embodiment of the compressor.
Figure 9:
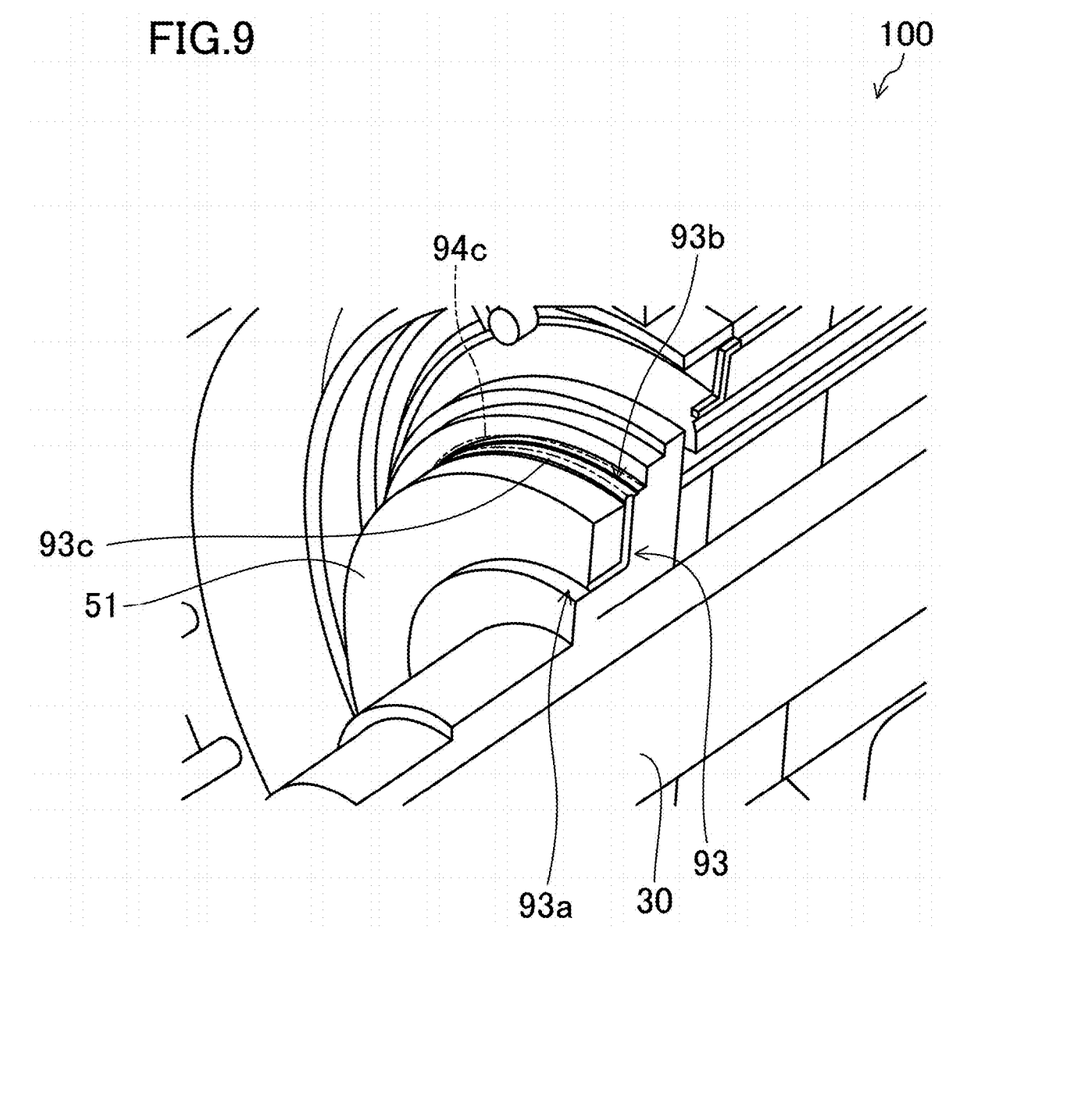
FIG. 9 is a perspective view illustrating the structure of an outer periphery of a rotor of a first thrust magnetic bearing.

As illustrated in FIGS. 8 and 9, the intermediate passage (Z2) further includes a rotor groove (93c). The rotor groove (93c) is formed in the outer periphery of the rotor (51). The rotor groove (93c) is formed annularly around the axis (P) of the rotary shaft (30). A second rotor opening (93b) is formed in the rotor groove (93c). The rotor groove (93c) communicates with the rotor passage (93) through the second rotor opening (93b).

A stator groove (94c) is formed in the inner periphery of the stator (52). The stator groove (94c) is formed annularly around the axis (P) of the rotary shaft (30). A first stator opening (94a) is formed in the stator groove (94c). The stator groove (94c) communicates with the stator passage (94) through the first stator opening (94a). The rotor groove (93c) is disposed in a radially inner side (Q1) with respect to the stator groove (94c).

The refrigerant flowing through the first passage (Z1) flows into the rotor passage (93), and is sent to the stator passage (94) through the rotor groove (93c) and the stator groove (94c). Thus, the stator (52) can be cooled by the refrigerant flowing through the stator passage (94). Providing the rotor groove (93c) and the stator groove (94c) keeps the rotor passage (93) and the stator passage (94) in communication with each other. This allows the refrigerant to stably flow from the rotor passage (93) to the stator passage (94). As a result, the refrigerant can stably flow, effectively keeping the rotary shaft (30) from vibrating.

Fifth Embodiment

A fifth embodiment of the compressor (100) will be described with reference to FIG. 10. The fifth embodiment is different from the first to fourth embodiments in the structure of the pumping function for sending the refrigerant. Thus, differences from the first to fourth embodiments will be mainly described below.

Figure 10:
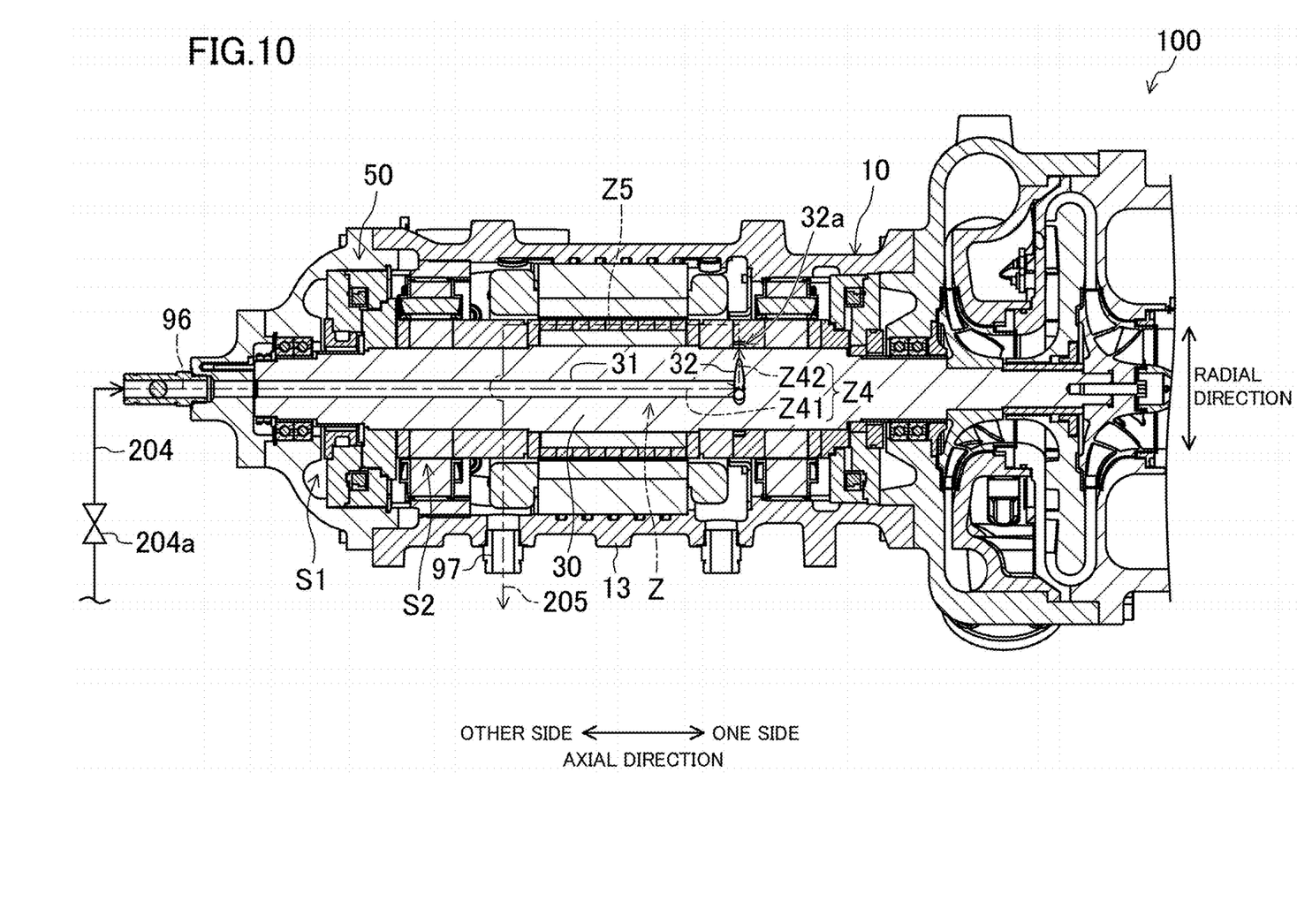
FIG. 10 is a view illustrating a fifth embodiment of the compressor.

As illustrated in FIG. 10, a third communication hole (96) is formed on the other side of the compressor (100) in the axial direction. The third communication hole (96) is located on the axis (P) of the rotary shaft (30) and extends in the axial direction. The third communication hole (96) communicates with the outside of the casing (10). The first branch passage (204) (see FIG. 1) communicates with the third communication hole (96). The first branch passage (204) is provided with a regulating valve (204a).

The rotary shaft (30) has a first shaft hole (31) and second shaft holes (32). The first shaft hole (31) is a hole provided on the axis (P) (see FIG. 3) of the rotary shaft (30) and extends in the axial direction. The other side of the first shaft hole (31) in the axial direction communicates with the third communication hole (96). The second shaft holes (32) extend in the radial direction. One end of each second shaft hole (32) communicates with one side of the first shaft hole (31) in the axial direction. The other end of each second shaft hole (32) opens at the outer periphery of the rotary shaft (30) to form a shaft opening (32a) communicating with the second space (S2).

The refrigerant passage (Z) includes a shaft passage (Z4) and a third passage (Z5).

The shaft passage (Z4) includes a first shaft passage portion (Z41) and a second shaft passage portion (Z42).

The first shaft passage portion (Z41) is a passage that passes through the third communication hole (96) and the first shaft hole (31), is provided on the axis (P) (see FIG. 3) of the rotary shaft (30), and extends in the axial direction.

The second shaft passage portion (Z42) is a passage that passes through the second shaft holes (32), and extends toward the radially outer side (Q2) from one side of the first shaft passage portion (Z41) in the axial direction (see FIG. 4).

The third passage (Z5) is a refrigerant passage provided in the second space (S2). The third passage (Z5) communicates with the second shaft passage portion (Z42), and passes through the second shaft passage portion (Z42) and the motor (20) to communicate with the fourth communication hole (97).

The fourth communication hole (97) allows the second space (S2) to communicate with the outside of the casing (10). The fourth communication hole (97) is provided in the third casing portion (13). The second branch passage (205) (see FIG. 1) communicates with the fourth communication hole (97).

Figure 11:
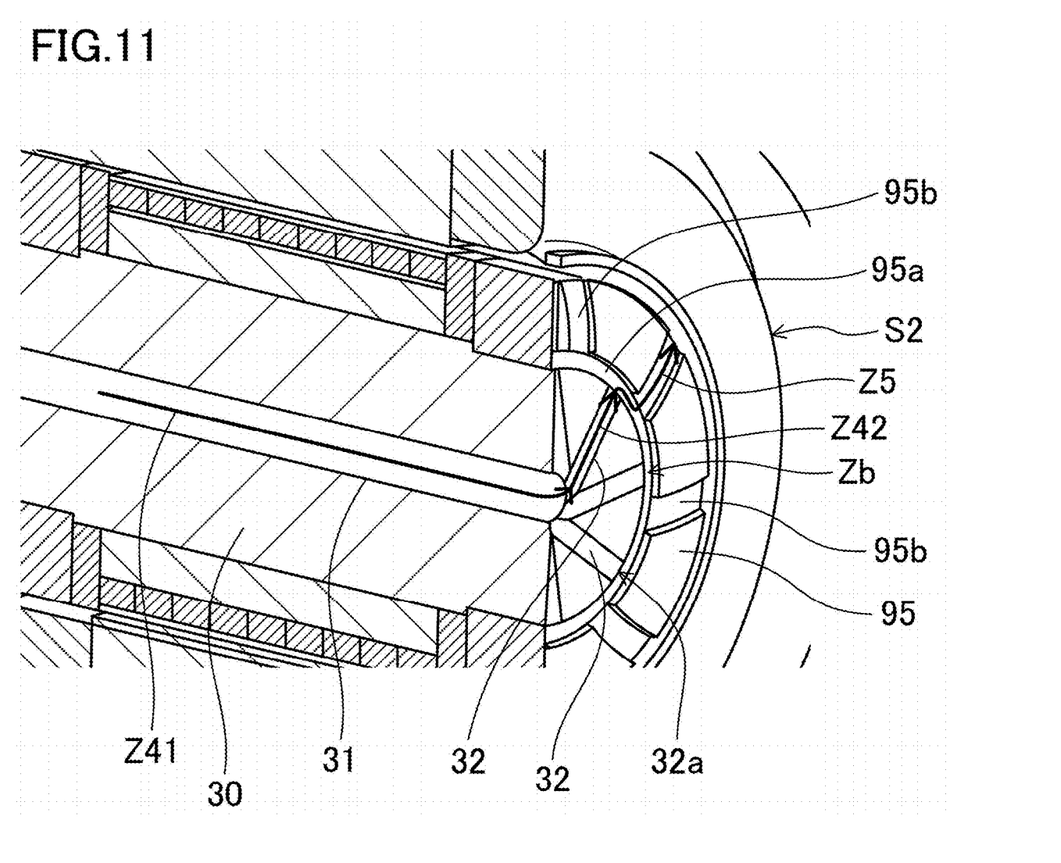
FIG. 11 is a perspective view illustrating a configuration of shaft holes.

As illustrated in FIG. 11, in the fifth embodiment, the multiple second shaft holes (32) are formed to extend radially from the first shaft hole (31). A spacer (95) is provided on the rotary shaft (30) to face the shaft openings (32a) of the second shaft holes (32). An annular groove (95a) is formed in the inner periphery of the spacer (95). Multiple passages (95b) radially extend from the annular groove (95a). Each of the passages (95b) opens at the outer periphery of the spacer (95).

Cooling Operation of Motor

As illustrated in FIGS. 10 and 11, the second shaft passage portion (Z42) is shaped to extend radially in the shaft passage (Z4), and thus, a centrifugal force acts on the refrigerant in the second shaft passage portion (Z42) when the rotary shaft (30) rotates so that the refrigerant is sent to the third passage (Z5) through the shaft openings (32a). This allows the shaft passage (Z4) rotating together with the rotary shaft (30) to function as a pump for sending the refrigerant as illustrated in FIG. 10. Thus, the refrigerant flowing through the first branch passage (204) can be effectively sent to the third passage (Z5) by the pumping function of the shaft passage (Z4).

The refrigerant flowing between the stator (21) and the rotor (22) of the motor (20) in the third passage (Z5) cools the rotor (22) of the motor (20). The refrigerant that has flowed through the third passage (Z5) is sent to the second branch passage (205) through the fourth communication hole (97).

The above-described structure in which the rotary shaft (30) is provided with the shaft passage (Z4) and the refrigerant is sent by the pumping function of the shaft passage (Z4) is a second example of the pump structure of the present invention.

As described above, the refrigerant is sent to the second space (S2) by the pump structure using the shaft passage (Z4). This can effectively adjust the differential pressure between the first space (S1) and the second space (S2) so that the second space (S2) is higher in air pressure than the first space (S1).

Sixth Embodiment

A sixth embodiment of the compressor (100) will be described below. The compressor (100) of the sixth embodiment is configured of a combination of the first structure (the structure in which the refrigerant is sent by the pumping function of the rotor passage (93), see FIGS. 2 to 9) of any of the first to fourth embodiments and the second structure (the structure in which the refrigerant is sent by the pumping function of the shaft passage (Z4), see FIGS. 10 and 11) of the fifth embodiment. In the sixth embodiment, the refrigerant is sent to the second space (S2) by using the pumping functions of both of the first and second structures.

While the embodiments and the variations thereof have been described above, it will be understood that various changes in form and details may be made without departing from the spirit and scope of the claims (e.g., (1) and (2) below). The embodiments, the variations thereof, and the other embodiments may be combined and replaced with each other without deteriorating intended functions of the present disclosure.

Variation of Close Contact Configuration (1) A variation of the close contact configuration will be described below. In the first to sixth embodiments, the stator (52) and the inner wall (10a) of the casing (10) make close contact with each other to partition the space in the casing (10) into the first space (S1) and the second space (S2) (see FIG. 4). However, the present invention is not limited to this example. A filler made of, for example, metal or resin, may be disposed between the stator (52) and the inner wall (10a) of the casing (10) to bring the stator (52) and the inner wall (10a) of the casing (10) into close contact with each other via the filler so that the space in the casing (10) is partitioned into the first space (S1) and the second space (S2).

Variation of First Passage of Refrigerant Passage (2) A variation of the first passage (Z1) of the refrigerant passage (Z) will be described below. In the first to fourth embodiments and the sixth embodiment, the first passage (Z1) extends from the first communication hole (91) to the first space (S1), passes through the bearing (81a) in the first space (S1), and communicates with the intermediate passage (Z2). However, the present invention is not limited to this example. A communication hole that allows the first space (S1) to communicate with the outside of the casing (10) may be formed in the second casing portion (12) of the casing (10) so that the first passage (Z1) extends from the communication hole to the first space (S1) and communicates with the intermediate passage (Z2) in the first space (S1).

As described above, the present disclosure is useful for a rotary fluid machine.

The invention claimed is:
1. A rotary fluid machine, comprising:
a casing;
a rotary shaft provided in the casing, the rotary shaft being rotatably supported;
a thrust magnetic bearing configured to support the rotary shaft in an axial direction, the thrust magnetic bearing including a rotor fixed to the rotary shaft and the thrust magnetic bearing being configured to partition a space in the casing into a first space and a second space; and
an adjustment mechanism configured to adjust a differential pressure between the first space and the second space, the adjustment mechanism including a rotor passage configured to send a refrigerant to the second space by rotation of the rotary shaft,
the rotor passage being provided in the rotor of the thrust magnetic bearing and configured to communicate with the first space and the second space, and
the rotor passage including an inlet opening arranged to communicate with the first space and an outlet opening arranged to communicate with the second space, the outlet opening being disposed farther outward in a radial direction than the inlet opening.
2. The rotary fluid machine of claim 1, wherein
the second space is higher in air pressure than the first space.

3. The rotary fluid machine of claim 1, wherein
the adjustment mechanism includes a regulating valve capable of adjusting an opening degree of the rotor passage.

4. The rotary fluid machine of claim 1, wherein
a stator of the thrust magnetic bearing is configured to make close contact with an inner wall of the casing.

5. The rotary fluid machine of claim 1, wherein
a filler is arranged between
a stator of the thrust magnetic bearing, and
an inner wall of the casing.

6. A rotary fluid machine, comprising:
a casing:
a rotary shaft provided in the casing, the rotary shaft being rotatably supported;
a motor;
a thrust magnetic bearing configured to support the rotary shaft in an axial direction, the thrust magnetic bearing being configured to partition a space in the casing into a first space and a second space;
an adjustment mechanism configured to adjust a differential pressure between the first space and the second space, the adjustment mechanism including a shaft passage configured to send a refrigerant to the second space by rotation of the rotary shaft;
a motor cooling passage that communicates with the shaft passage and passes axially through the motor; and
a communication hole arranged to communicate between the motor cooling passage and an exterior of the rotary fluid machine,
the shaft passage being provided in the rotary shaft and configured to communicate with the second space,
the shaft passage including a first shaft passage portion extending axially through the rotary shaft and a second shaft passage portion extending radially outward from the first shaft passage portion and communicating with the motor cooling passage, the second shaft passage portion and the communication hole being disposed on axially opposite sides of the motor with the motor cooling passage disposed there-between.

* * * * *